US007889360B2

(12) United States Patent
Kiwada (10) Patent No.: US 7,889,360 B2
(45) Date of Patent: Feb. 15, 2011

(54) IMAGE FORMING DEVICE, IMAGE FORMING METHOD, IMAGE FORMING PROGRAM, COMPUTER READABLE RECORDING MEDIUM ON WHICH THE PROGRAM IS RECORDED

(75) Inventor: Masakatsu Kiwada, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 2051 days.

(21) Appl. No.: 10/800,873

(22) Filed: Mar. 16, 2004

(65) Prior Publication Data

US 2005/0141004 A1 Jun. 30, 2005

(30) Foreign Application Priority Data

Dec. 26, 2003 (JP) ............................. 2003-435731

(51) Int. Cl.
*G06K 15/00* (2006.01)
(52) U.S. Cl. .................. 358/1.12; 358/1.1; 358/1.13; 358/1.9
(58) Field of Classification Search ............... 358/1.14, 358/1.18, 1.12, 443, 3.28, 1.13, 1.16, 3.29–3.32; 235/492, 382, 85; 283/85; 399/361–410; 346/134; 382/135, 181, 317
See application file for complete search history.

(56) References Cited

U.S. PATENT DOCUMENTS

| | | | | |
|---|---|---|---|---|
| 4,987,447 A | * | 1/1991 | Ojha | ............................. 399/84 |
| 5,825,911 A | * | 10/1998 | Nishigai et al. | ............. 382/135 |
| 6,827,279 B2 | * | 12/2004 | Teraura | ........................ 235/492 |
| 2003/0053114 A1 | * | 3/2003 | Hopper | ........................ 358/1.15 |
| 2003/0151762 A1 | * | 8/2003 | Cherry et al. | ............... 358/1.14 |

FOREIGN PATENT DOCUMENTS

| | | |
|---|---|---|
| JP | 03-175075 | 7/1991 |
| JP | 08-241451 | 9/1996 |
| JP | 10-334215 | 12/1998 |
| JP | 2001-024845 | 1/2001 |
| JP | 2002-209039 | 7/2002 |
| JP | 2002-337426 | 11/2002 |

OTHER PUBLICATIONS

A Notification of Reasons for Refusal dated Feb. 28, 2006, issued in corresponding Japanese Patent Application No. 2003-435731, and translation thereof.

* cited by examiner

*Primary Examiner*—King Y Poon
*Assistant Examiner*—Iriana Cruz
(74) *Attorney, Agent, or Firm*—Buchanan Ingersoll & Rooney PC (57) ABSTRACT

MFP 100 transports the document one sheet at a time by means of ADF 141 to a specified reading position, and judges whether the document is an IC-tagged printed matter by means of IC tag reader 143B. If the document is an IC-tagged printed matter, it prints the image data acquired from the IC tag by IC tag reader 143B by means of printing unit 151. On the other hand, if the document is not an IC-tagged printed matter, it processes it by either one of the methods of optical copying, blank output or no output according to the user's choice. This makes it possible for the device to treat the document with a proper method or the method the user chooses when the document is a mixture of IC-tagged documents and conventional documents.

11 Claims, 11 Drawing Sheets

410

```
IC-TAGGED DOCUMENT IS INCLUDED HERE. IC TAGGED DOCUMENT STORES
THE ORIGINAL IMAGE DATA OF THE DOCUMENT. PRINTING OF HIGH IMAGE
QUALITY CAN BE OBTAINED IF THE ORIGINAL IMAGE DATA IS USED. HOWEVER,
THE PORTION ADDED BY HANDWRITING WILL BE LOST.

DO YOU WANT TO USE THE ORIGINAL IMAGE DATA STORED
IN THE IC TAGGED DOCUMENT?

[ YES ]     [ NO ]
```

310
```
<HEADER>
<DOCUMENT ID>000001</DOCUMENT ID>
<PAGE NUMBER>1</PAGE NUMBER>
<COPYING PERMISSION>YES</COPYING PERMISSION>
<MODIFIABLE ATTRIBUTES>COLOR, RESOLUTION, FONT SIZE, FONT COLOR,
FONT TYPE</MODIFIABLE ATTRIBUTE>
</HEADER>
```

320
```
<IMAGE DATA>
<COLOR>FULL COLOR</COLOR>
<RESOLUTION>600 dpi</RESOLUTION>
<FONT SIZE>72 pt</FONT SIZE>
<FONT COLOR>RED</FONT COLOR>
<FONT TYPE>GOTHIC</FONT TYPE>
ABC
</IMAGE DATA>
```

IC-TAGGED DOCUMENT IS INCLUDED HERE. IC TAGGED DOCUMENT STORES THE ORIGINAL IMAGE DATA OF THE DOCUMENT. PRINTING OF HIGH IMAGE QUALITY CAN BE OBTAINED IF THE ORIGINAL IMAGE DATA IS USED. HOWEVER, THE PORTION ADDED BY HANDWRITING WILL BE LOST.

DO YOU WANT TO USE THE ORIGINAL IMAGE DATA STORED IN THE IC TAGGED DOCUMENT?

YES    NO

PRINT ON IC-TAGGED PAPER?

YES    NO

PLEASE SPECIFY THE METHOD OF PROCESSING DOCUMENTS WITHOUT ORIGINAL IMAGE DATA.

OPTICAL COPYING

OUTPUT BLANK PAPER

NO PRINTING

IMAGE FORMING DEVICE, IMAGE FORMING METHOD, IMAGE FORMING PROGRAM, COMPUTER READABLE RECORDING MEDIUM ON WHICH THE PROGRAM IS RECORDED

This application is based on Japanese Patent Application No. 2003-435731 filed on Dec. 26, 2003, the contents of which are hereby incorporated by reference.

BACKGROUND OF THE INVENTION

1. Field of the Invention

The invention relates to a printed matter equipped with an electronic tag and an image forming device for copying them or other purposes, in particular, a electronically tagged printed matter and an image forming device capable of allowing the user to use attribute information of the printed matter or original image data during copying.

2. Description of Related Art

Printed matters that hold the attribute information thereof on themselves by using printing paper with an IC tag, which is embedded in a certain part of printing paper, and image forming devices that allow the users to use the attribute information by reading it from the IC tag during the printing process have been known (e.g., JP-2001-24845A). These printing matters and devices are capable of providing outputs that reflect attribute information of the printed matters during copying, for example, overlaying noises on printed matters when there is information that prohibits copying. However, since said printed matters and devices are based on the optical copying technology, there are inherent problems, e.g., deterioration of images of copies.

Various image forming devices that read identifiers attached to the printed matter when copying the printed matter, and download from a server corresponding original image data for printing (e.g., JP-2002-209039A). Such devices can maintain image quality on copies equivalent to that of the original printed matter as the original image data for the printed matter can be used on copies. However, said devices can be used only under environments where dedicated servers, networks and other facilities are built in.

In the meanwhile, certain recording media such as IC cards have been known wherein image data recorded on said recording media are printed on the surfaces of the substrates (e.g., JP-10-334215A). However, the image on the surfaces of the substrates of those recording media are printed simply for the purpose of easy visual recognitions of the image data recorded on said recording media, and they don't have sufficient characteristics for being distributed as printed matters or to be copied.

SUMMARY OF THE INVENTION

As a means of solving the above mentioned problems of the prior art, the applicant of the present invention is filing simultaneously a patent application for an electronically tagged printed matter that is capable of keeping the attribute information and original image data of printed matter on the printed matter themselves using IC-tagged printing paper wherein an IC tag is embedded in certain parts of the printing paper as well as an image forming device that is capable of reading out and using the attribute information and original image data of the printed matter from the IC tag during the copying process of such a printed matter. Using such a device and a printed matter makes it possible to use during the copying process the attribute information and original image data of the printed matter held on the printed matter themselves, so that copies of high image quality reflecting the attribute information can be obtained. However, no image forming device has been known for providing appropriate processes depending on the type of document when both IC-tagged documents and conventional documents exist in a mixed state for said printed matter on said device.

The invention is therefore intended for providing image forming device capable of processing documents in appropriate manners or in the manner the user prefers depending on the type of document when both electronically tagged documents and conventional documents exist in a mixed state on an image forming device capable of reading out and using the attribute information and original image data of the printed matter from the electronic tags during the copying process of such an electronically tagged printed matter.

Said objective of the present invention can be accomplished by the following means:

(1) An image forming device comprising: a transporting unit for transporting a document sheet by sheet to a specified reading position; a judging unit for judging whether a document transported by said transporting unit is an electronically tagged printed matter wherein image data is printed on an electronically tagged printing paper equipped with an electronic tag for storing electronic data in a certain part of the printing paper and said electronic tag stores image data printed on said electronically tagged printing paper; a reading unit for reading the image data from the electronic tag of the document which is judged as said electronically tagged printing matter by said judgment unit; and a printing unit for printing the image data read by said reading unit.

(2) An image forming method comprising: a transporting step of transporting a document sheet by sheet to a specified reading position; a judging step of judging whether a document transported by said transporting step is an electronically tagged printed matter wherein image data is printed on an electronically tagged printing paper equipped with an electronic tag for storing electronic data in a certain part of the printing paper and said electronic tag stores image data printed on said electronically tagged printing paper; a reading step of reading the image data from the electronic tag of the document which is judged as said electronically tagged printing matter by said judgment step; and a printing step of printing the image data read by said reading step.

(3) An image forming program for causing an image forming device to execute: a transporting step of transporting a document sheet by sheet to a specified reading position; a judging step of judging whether a document transported by said transporting step is an electronically tagged printed matter wherein image data is printed on an electronically tagged printing paper equipped with an electronic tag for storing electronic data in a certain part of the printing paper and said electronic tag stores image data printed on said electronically tagged printing paper; a reading step of reading the image data from the electronic tag of the document which is judged as said electronically tagged printing matter by said judgment step; and a printing step of printing the image data read by said reading step.

(4) A computer readable recording medium on which the image forming program as described in (3) is recorded.

DESCRIPTION OF THE PREFERRED EMBODIMENTS

The preferred embodiments of the invention will be described in detail below with reference to the accompanying drawings.

Figure 1:
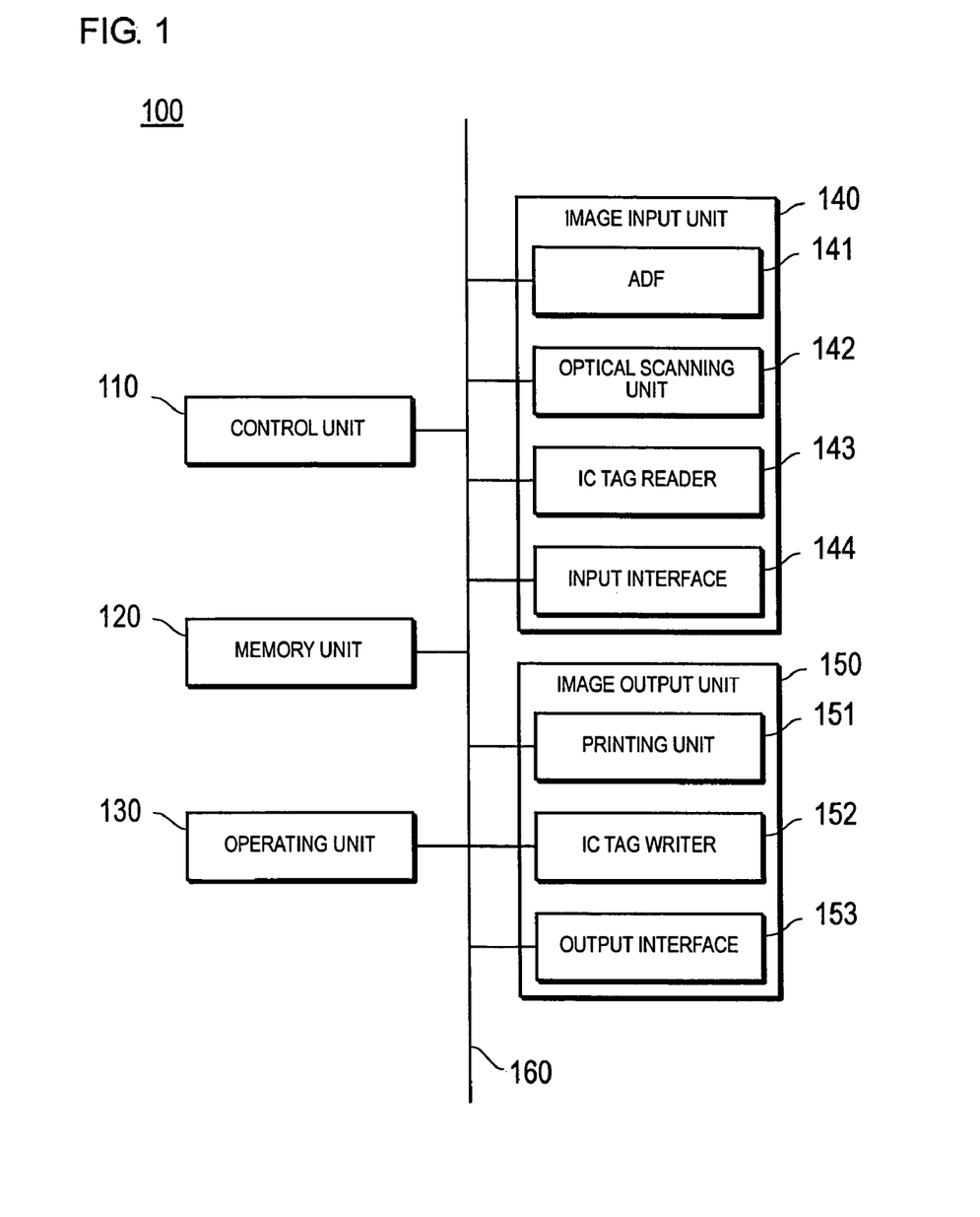
FIG. 1 is a block diagram showing the constitution of a MFP 100 according to the present embodiment.
Figure 2:
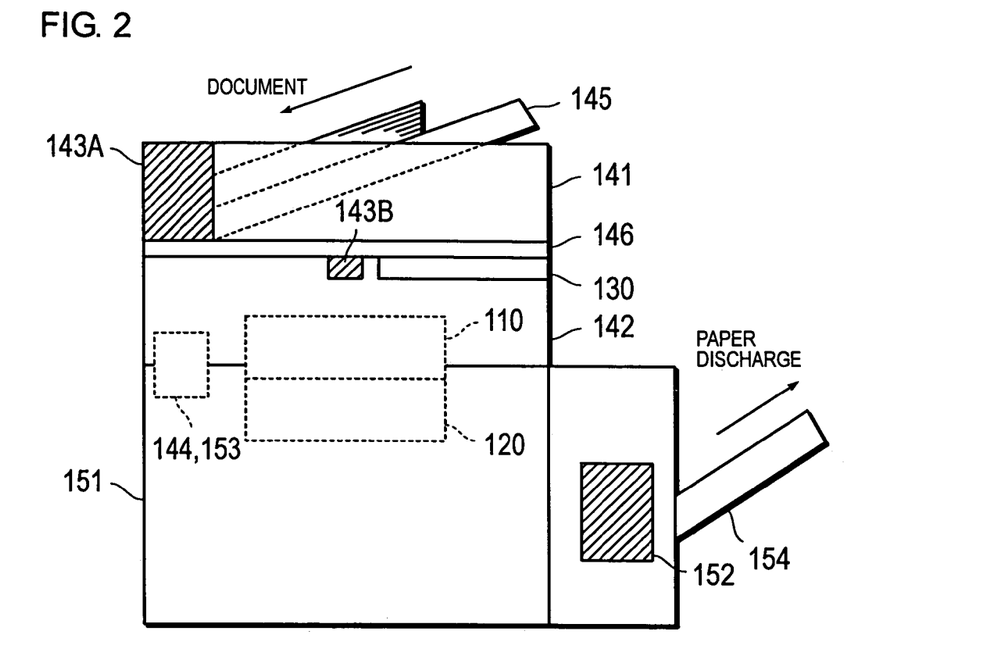
FIG. 2 is a block diagram showing the constitution of MFP 100.

FIG. 1 and FIG. 2 are the block diagram and the schematic diagram of MFP (Multiple Function Peripheral) 100 as an image forming device of the first embodiment of the present invention. As can be seen from FIG. 1 and FIG. 2, MFP 100 is equipped with a control unit 110, a memory unit 120, an operating unit 130, an image input unit 140, and an image output unit 150, all of which are interconnected to exchange signals with each other via bus 160.

The control unit 110 is a CPU, and controls various parts indicated above and executes various arithmetic processes according to a program.

The memory unit 120 includes a ROM for storing various programs and parameters, a RAM for temporarily storing programs and data, a hard disk used for storing various programs and data, or temporarily storing image data obtained from image processing, and others.

Operating unit 130 consists of a touch panel for displaying various information and entering various setup inputs, a ten key pad for setting up the number of copies to make and others, a start key for instructing the start of operation, a stop key for instructing the operation to stop, various fixed keys such as a reset key for initializing various setup conditions, indicator lamps, etc.

Image input unit 140 consists of an ADF (Auto Document Feeder) 141, an optical scanning unit 142, an IC tag reader 143, an input interface 144, etc.

ADF 141 transports a single or multiple sheets of paper set on document tray 145, transports them one sheet at a time to a specified scanning position of document table 146, and discharges the document sequentially after scanning it.

Optical scanning unit 142 irradiates a document set on the specified scanning position of document table 146 or transported to the location by the ADF with a light source such as a fluorescent lamp and the like, converts reflected lights from the document surface into electrical signals with the help of light sensitive devices such as CCD or CIS, and generates image data (bitmap data) from the electrical signals.

IC tag reader 143 reads the electronic data recorded on the non-contacting type IC tag of the IC-tagged document to be described later. As the communication system between IC tag reader 143 and the IC tag, those of the international standards such as ISO 14443 and ISO 15693 can be applied using frequency bands such as 135 kHz, 13.56 MHz, and 2.45 GHz. However, the communication systems that can be applied are not limited to those mentioned above, and other known communication systems or proprietary communication systems may be used. The IC tag reader may be able to read all the electronic data recorded on a plurality of IC tags within the communicable range simultaneously.

IC tag reader 143A reads the electronic data recorded on the non-contacting type IC tag of the IC-tagged document set on document tray 145. In order to prevent IC tag reader 143A from detecting by mistake IC tags existing in the vicinity of MFP 100A, other than the tags of the IC-tagged document set on document tray 145, it is designed specifically for short distance communications within a proper distance range, for example, within several centimeters to several tens of centimeters.

IC tag reader 143B reads electronic data recorded on non-contacting type IC tags of the IC-tagged document transported to the specified scanning position of document table 146 by ADF 141. In order to prevent IC tag reader 143B from detecting by mistake IC tags existing in the vicinity of, but not mounted on the IC-tagged document transported to document tray 146 by ADF 141, it is designed specifically for short distance communications within a proper distance range, for example, within several millimeters to several tens of centimeters. A metallic plate is provided between ADF 141 and document table 146 to prevent wireless communications between them in such a way that IC tag reader 143A cannot detect the IC tags of the IC-tagged document on document table 146, while IC tag reader 143B cannot detect the IC tags of the IC-tagged document on document table 145.

Input interface 144 is an interface for receiving input such as image data from external equipment, for which local connection interfaces, e.g., network interfaces such as Ethernet®, Token Ring, and FDDI standards, serial interfaces such as USB and IEEE 1394, parallel interfaces such as SCSI, IEEE 1284, and wireless communication interfaces such as Bluetooth, IEEE 802.11, HomeRF, IrDA, as well as telephone circuit interfaces for connection to telephone circuits can be used.

Image output unit 150 consists of printing unit 151, IC tag writer 152, output interface 153, etc.

Printing unit 151 prints image data to printing paper by the electronic photography method through the steps of electric charging, exposure, development, transfer and fixing, and discharges the printed paper to a paper discharge tray 154.

IC tag writer 152 is used to write electronic data on non-contacting type IC tags on the IC-tagged printing paper to be described later. A device designed for short distance communications similar to the one for IC tag reader 143B is used as IC tag writer 152, and the system for communications between IC tag writer 152 and IC tags can be similar to the one used for IC tag readers 143A and 143B.

Output interface 153 is an interface for transmitting image files to external equipment and an interface similar to said input interface 144 can be used.

Because of the abovementioned constitutions, MFP 100A has all of the functions as a scanner for scanning the document and transmitting image data to external equipment, as a printer for printing the image data received from external equipment, as a copying machine for scanning the document image and printing it, and as a facsimile machine for receiving and transmitting image data through telephone circuits.

MFP 100 may contain constitutional elements other than those described above, or may not include a portion of the abovementioned elements. In this embodiment, for example, image input unit 140 does not necessarily have to have input interface 144, and output unit 150 does not have to have output interface 153.

Figure 3:
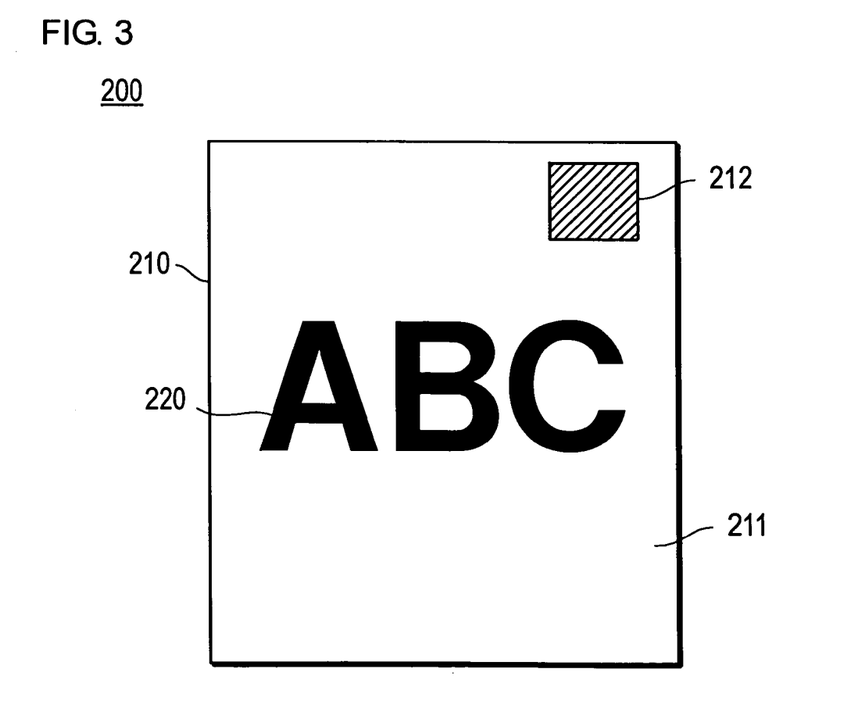
FIG. 3 is a schematic diagram showing a constitution of an IC-tagged document 200.
Figure 4:
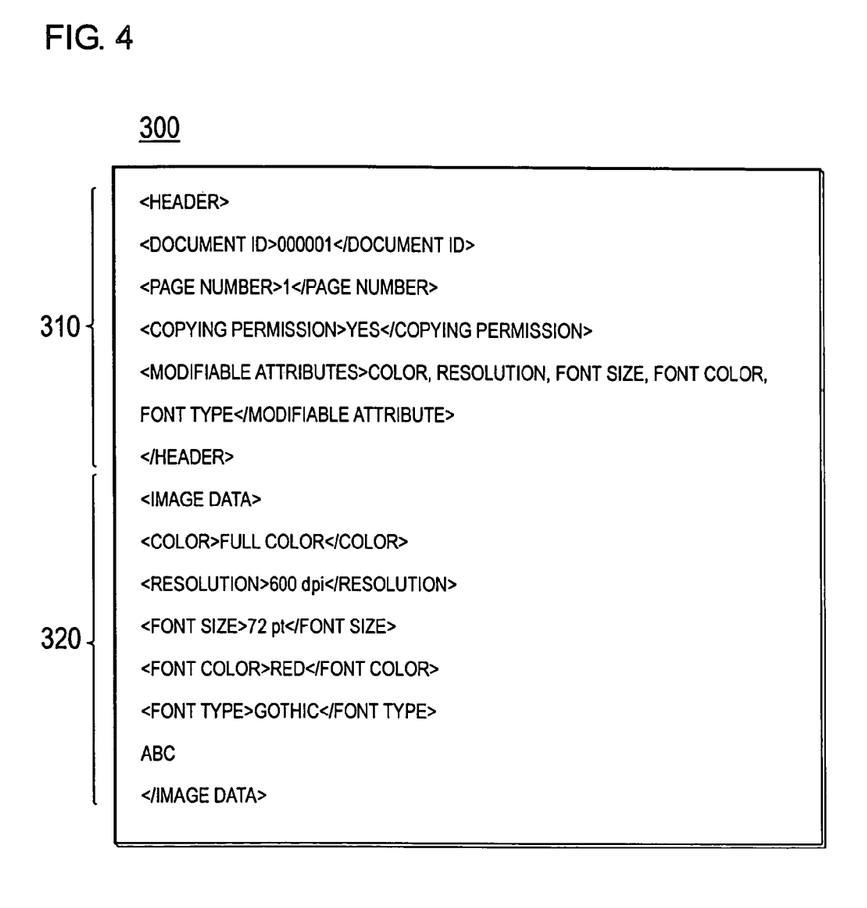
FIG. 4 is a diagram for describing electronic data recorded on an IC tag 212 of IC-tagged document 200.

Next, let us describe the IC-tagged document according to this embodiment referring to FIG. 3 and FIG. 4. FIG. 3 is a schematic diagram showing a constitution of an IC-tagged document 200 according to this embodiment. As shown in FIG. 3, IC-tagged document 200 is a printed matter having an image 220 printed on IC-tagged printing paper 210 wherein an IC tag 212 is embedded on a certain part of a printing paper 211 made of paper, plastic film and others, and original image data concerning image 220, which is printable by MFP 100, is recorded on IC tag 212 of IC-tagged document 200.

IC tag 212 is a non-contacting type electronic tag using wireless communication equipped with a memory unit (not shown) consisting of IC chips and an antenna unit (not shown) consisting of a coil built inside the chip, conducts wireless communications with IC tag readers 143A and 143B, or IC tag writer 152 by means of electromagnetic induction coupling receiving radio waves emitted by IC tag readers 143 and IC tag writer 152 to read and write electronic data. With the development of minute IC tags with a typical thickness of 0.25 mm, which can be embedded in a printing sheet made of paper or other materials, in recent years, it is expected that a large amount of information will soon be stored in IC tags as the memory capacities of IC chips have been increasing rapidly.

FIG. 4 is a diagram for describing the contents of the electronic data stored in IC tag 212. As can be seen from FIG. 4, the memory unit of IC tag 212 stores electronic data 300. Electronic data 300 is described in the XML format, and contains a header part 310 storing attribute information of IC-tagged document 200 such as a document ID specific to the document, a page number, whether it is allowed to make copies or not, and an image data part 320 storing the original image data concerning image 220 printed on IC-tagged printing paper 210. However, the type of the information and the format of the electronic data recorded on IC tag 212 are not limited to those examples.

Further, IC-tagged printing paper 210 shown in FIG. 3 is not limited to the format shown in the figure; for example, IC tag 212 can be as large as to cover substantially the entire surface of printing paper 211, or a plurality of IC tags 212 are distributed substantially over the entire surface of printing paper 211 to be embedded therein.

Next, the outline of MFP 100 according to this embodiment will be described below. FIG. 5-10 represent a flowchart showing the image forming process of MFP 100 according to this embodiment. The algorithm indicated by the flowchart of FIG. 5-10 is stored as a control program on memory 120 of MFP 100, read out and executed by control unit 110 when the operation starts.

Figure 5:
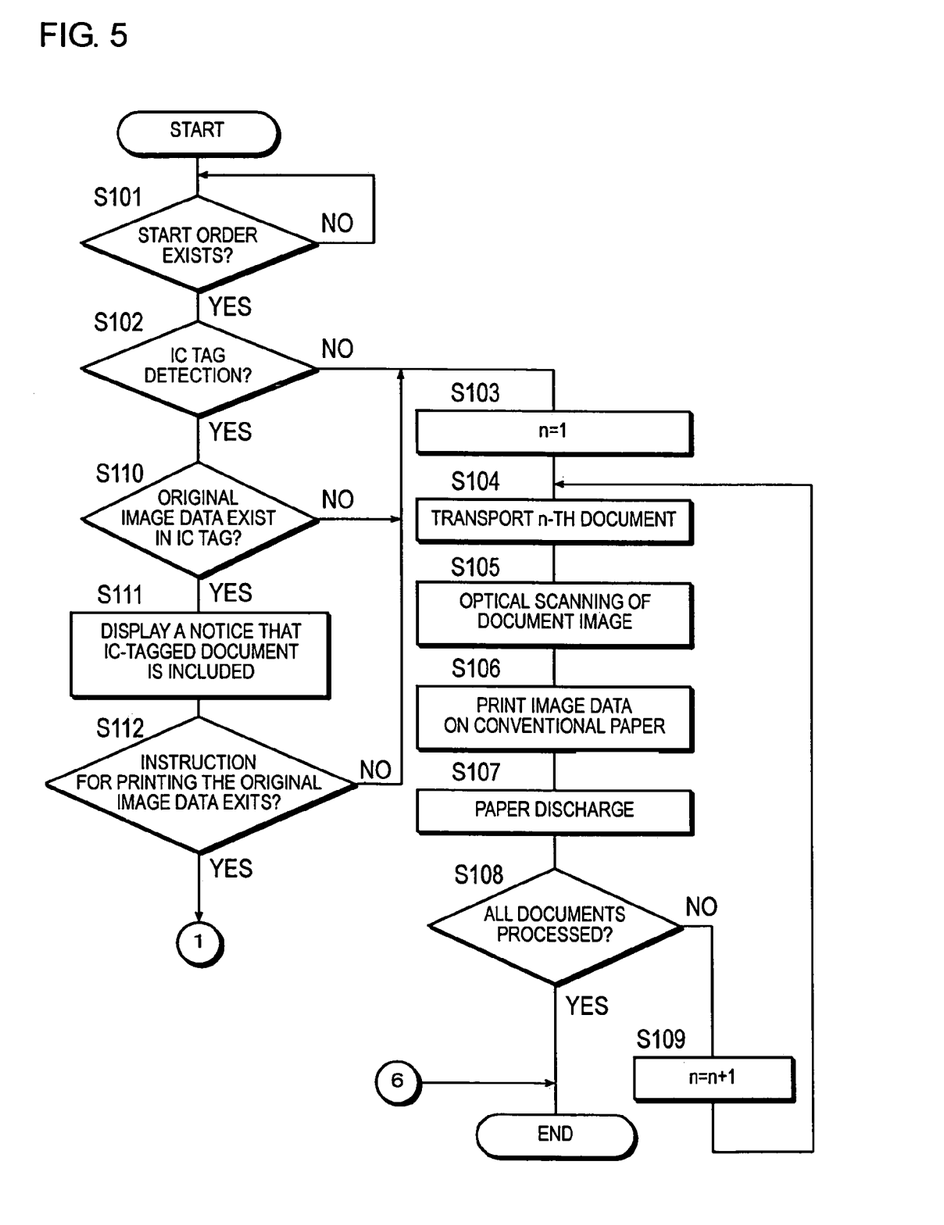
FIG. 5 is a flowchart showing the sequence of image forming process by means of MFP 100.
Figure 6:
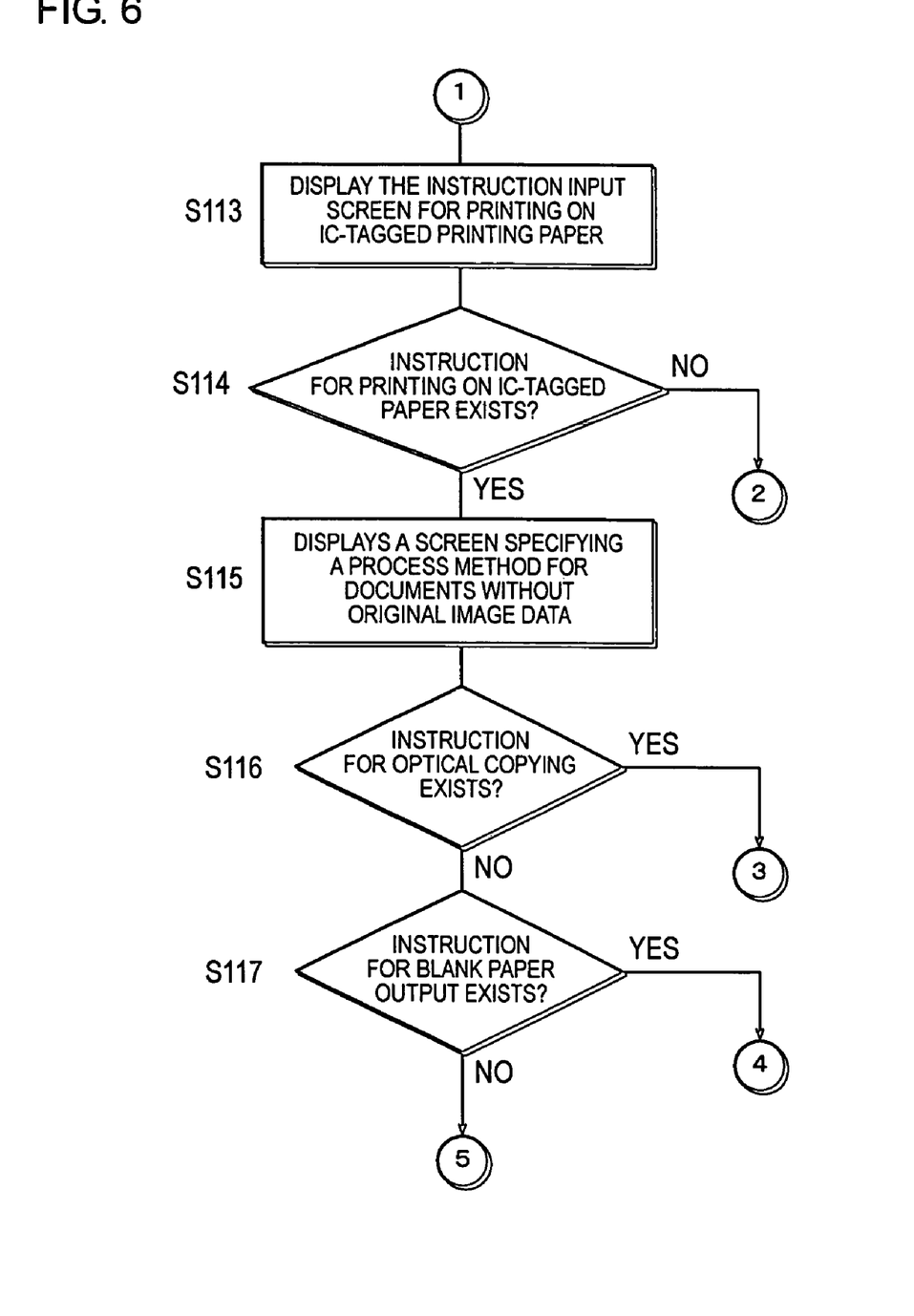
FIG. 6 is a flowchart showing the sequence of image forming process by means of MFP 100.
Figure 7:
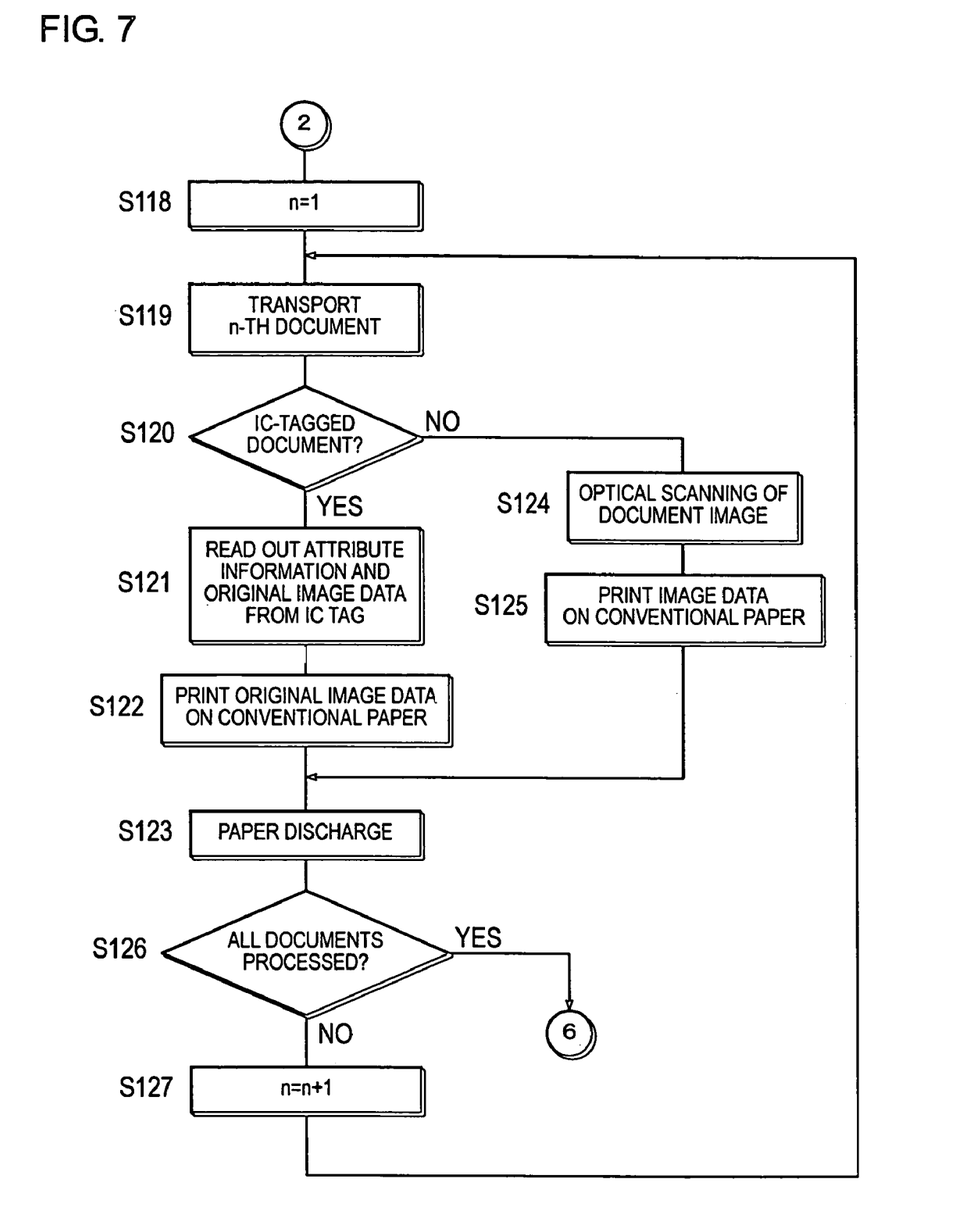
FIG. 7 is a flowchart showing the sequence of image forming process by means of MFP 100.
Figure 8:
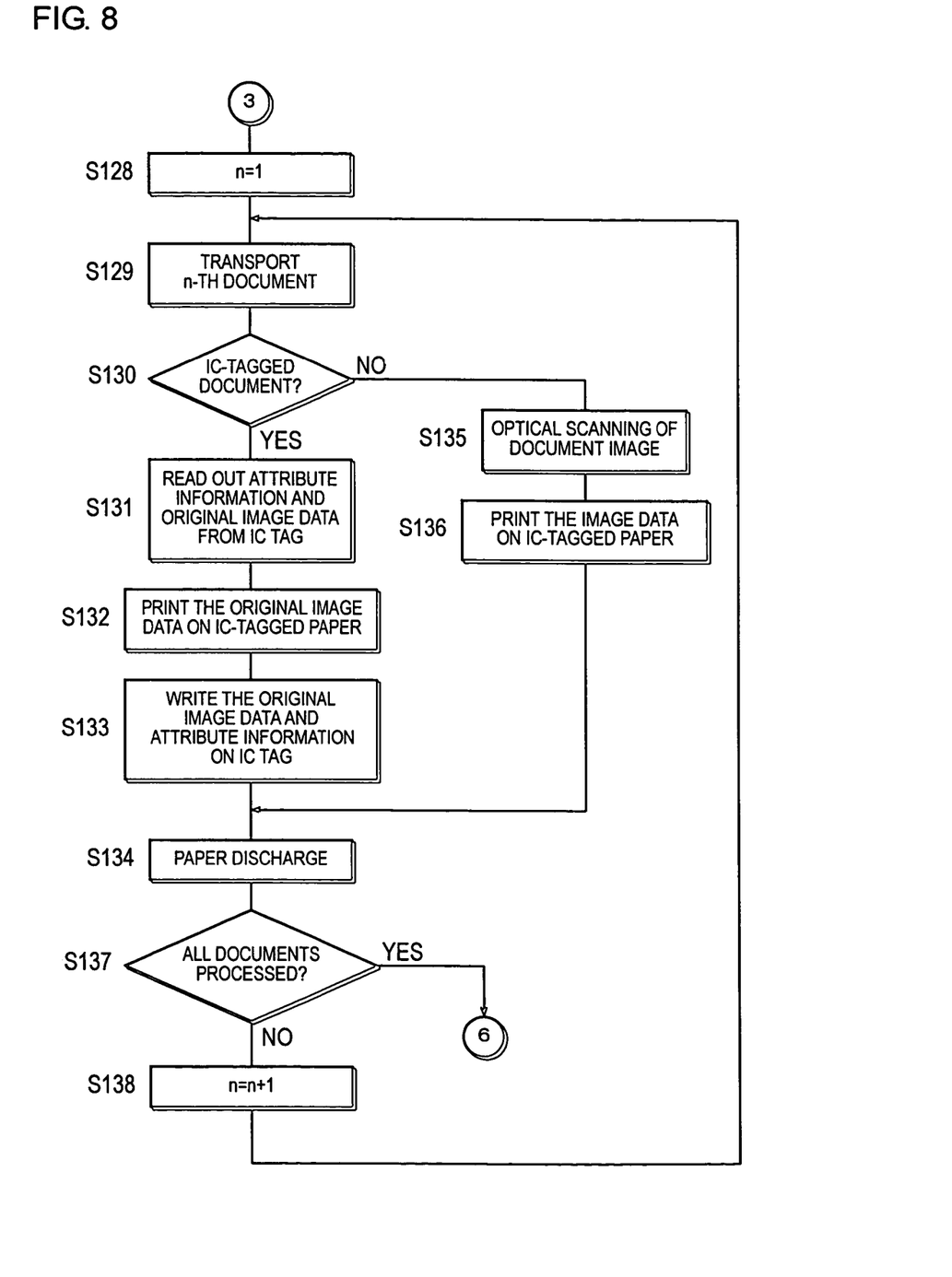
FIG. 8 is a flowchart showing the sequence of image forming process by means of MFP 100.
Figure 9:
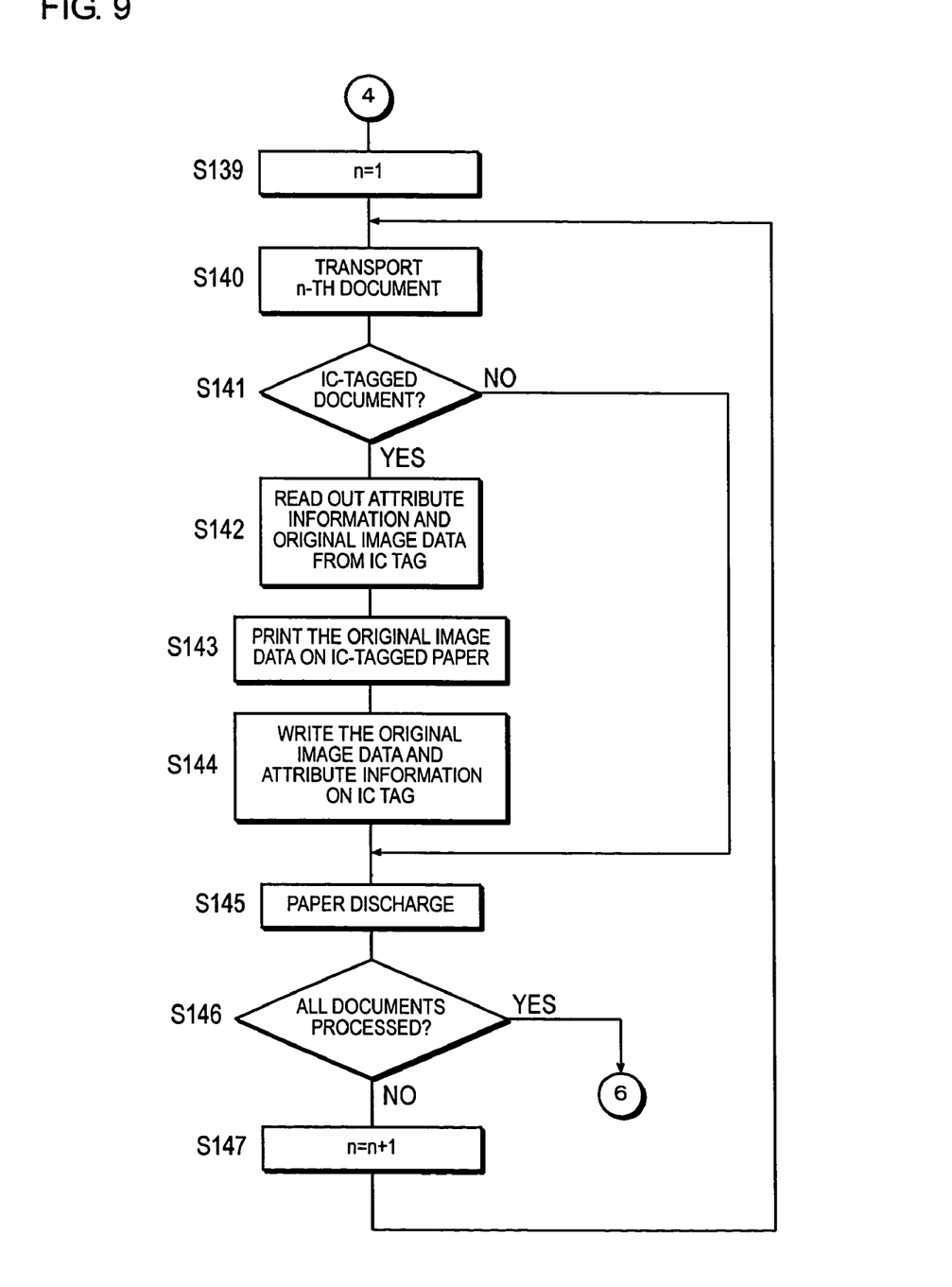
FIG. 9 is a flowchart showing the sequence of image forming process by means of MFP 100.
Figure 10:
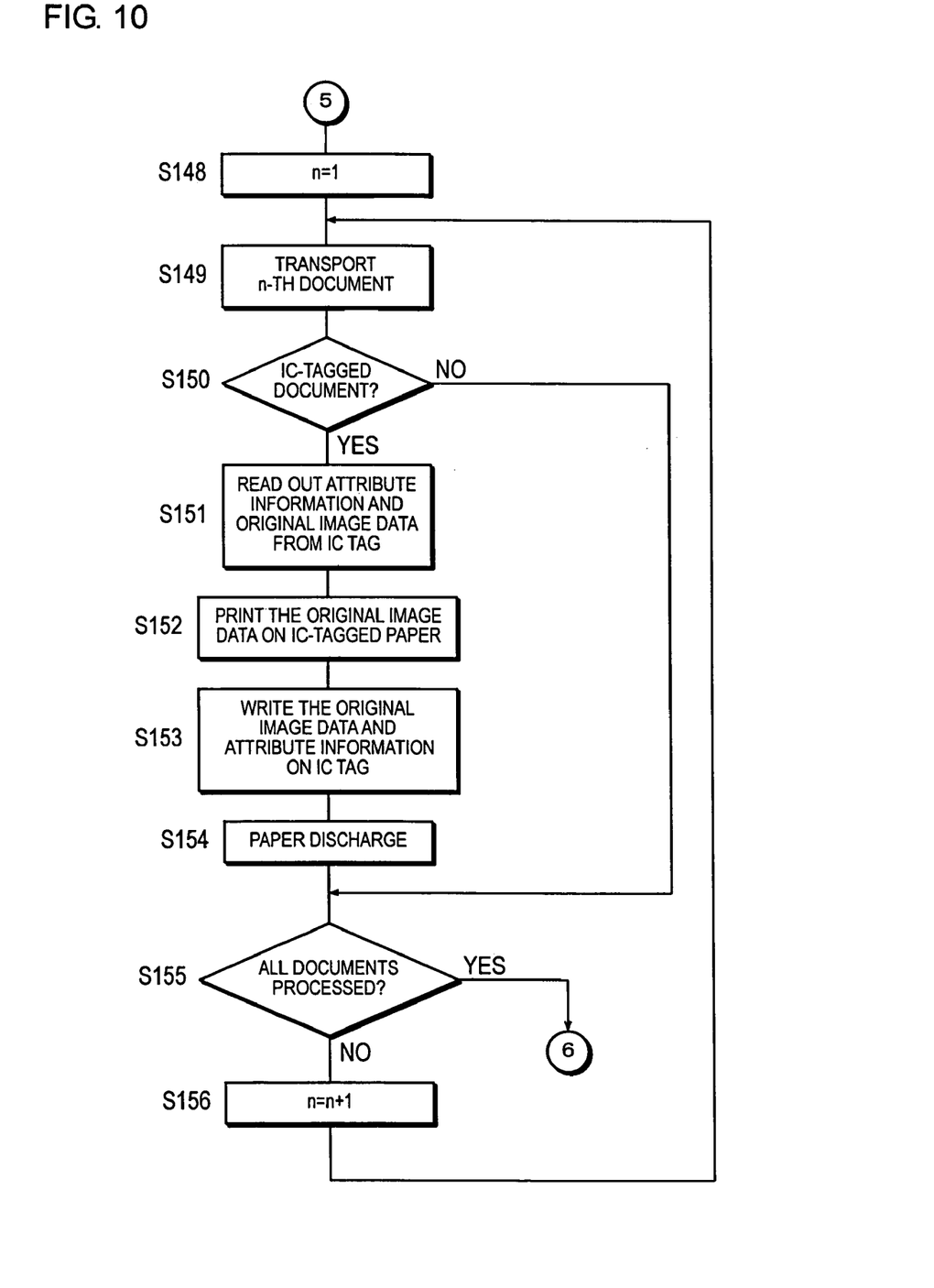
FIG. 10 is a flowchart showing the sequence of image forming process by means of MFP 100.

In FIG. 5, MFP 100 stands by until it is ordered to start image processing (S101: No). The user sets the document on document tray 145, specifies the printing condition such as the number of copies to be printed and the type and size of printing paper using operating unit 130, and presses the start key.

Upon receiving an instruction for startup from operating unit 130 (S101: Yes), MFP 100 searches IC tag of the document set on document tray 145 by means of IC tag reader 143A, and makes a judgment whether the document contains an IC-tagged document or not (S102). If IC tags are not detected in step S102, it judges that the document set on document tray 145 does not contain any IC-tagged document (S102: No), transports the document set on document tray 145 one sheet at a time (S103-S109) to the specified scanning position of document table 146 by means of ADF 141 (S104), scans the document image by optical scanning unit 142 and converts it to image data (S105), prints it on conventional paper according to the printing condition by means of printing unit 151 (S106), and discharge the printed paper into discharge tray 154 (S107).

If it detects IC tag in step S102, it determines that the document set in document tray 145 contains IC-tagged documents (S102: Yes) and further makes judgment whether the IC tag of the IC-tagged documents contain original image data or not by means of IC tag reader 143A (S110); if not original image data is recorded in the IC tag (S110: No), it transports the document and prints the image data obtained by optical scanning as in the case of conventional documents (S103-S109).

Figure 11:
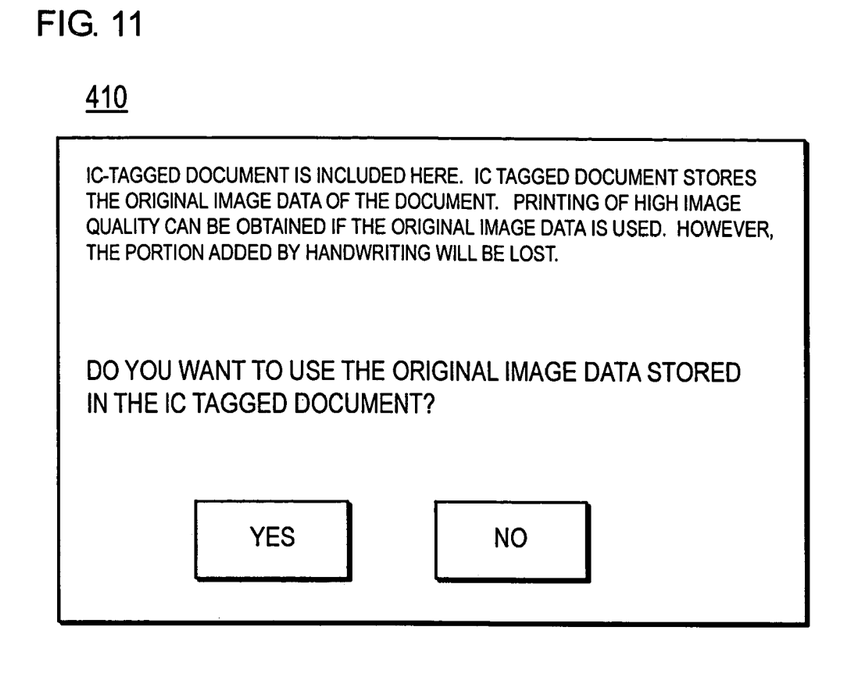
FIG. 11 is an example screen to be displayed on a touch panel of operating unit 130 of MFP 100.

If it detects original image data stored in the IC tag in step S110 (S110: Yes), it displays on the touch panel of control unit 130 as exemplified by a screen 410 shown in FIG. 11 that the document contains IC-tagged document and the original image data is stored in the IC tag of the IC-tagged document (S111), and accepts an instruction on whether the original image data on the IC tag is to be printed or not concerning the IC-tagged document (S112). If it receives an instruction for not printing the original image data (S112: No), it transports the document same as in the case of a conventional document, and prints the image data obtained by optically scanning (S103-S109).

Figure 12:
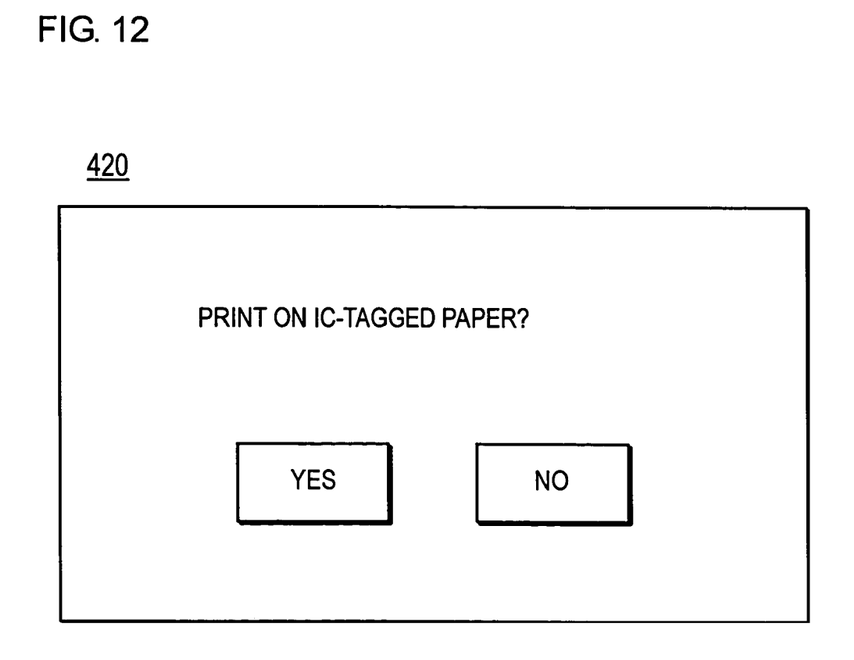
FIG. 12 is an example screen to be displayed on a touch panel of operating unit 130 of MFP 100.

On the other hand, if an instruction for printing the original image data is received in step S112 (S112: Yes), it proceeds to step S113 shown in FIG. 6, displays an instruction on the touch panel of control unit 130 for printing on the IC-tagged printing paper as exemplified by a screen 420 of FIG. 12 (S113), and receives instruction input for whether to print the data on IC-tagged printing paper or not (S114).

When there is no instruction for printing on IC-tagged printing paper in step S114 (S114: No), it proceeds to step S118 of FIG. 7, transports the first sheet of the document set on document tray 145 to a specified scanning position on document table 146 by means of ADF 141 (S118 and S119), searches IC tag by means of IC tag reader 143B to determine whether the document on document table 146 is an IC-tagged document (S120). If IC tag is detected on the document on document table 146, it judges that it is an IC-tagged document (S120: Yes), reads the attribute information and original image data of said document from the IC tag of the document on document table 146 by means of IC tag reader 143B and stores to memory unit 120 (S121), prints the original image data based on the attribute information by means of printing unit 151 (S122), and discharges the printing paper to discharge tray 154 (S123) If IC tag is not detected on the document on document table 146 in step S120 (S120: No), it judges that it is a conventional document (S120: No), scans document image by means of optical scanning unit 142, converts it to image data (S124), prints it on conventional printing paper by means of printing unit 151 (S125), and discharges it to paper discharge tray 154 (S123). It repeats the same process for the rest of the unprocessed document (S126: No, S127, and S119-S125), and terminates the image forming process when all the documents are processed (S126: Yes).

Figure 13:
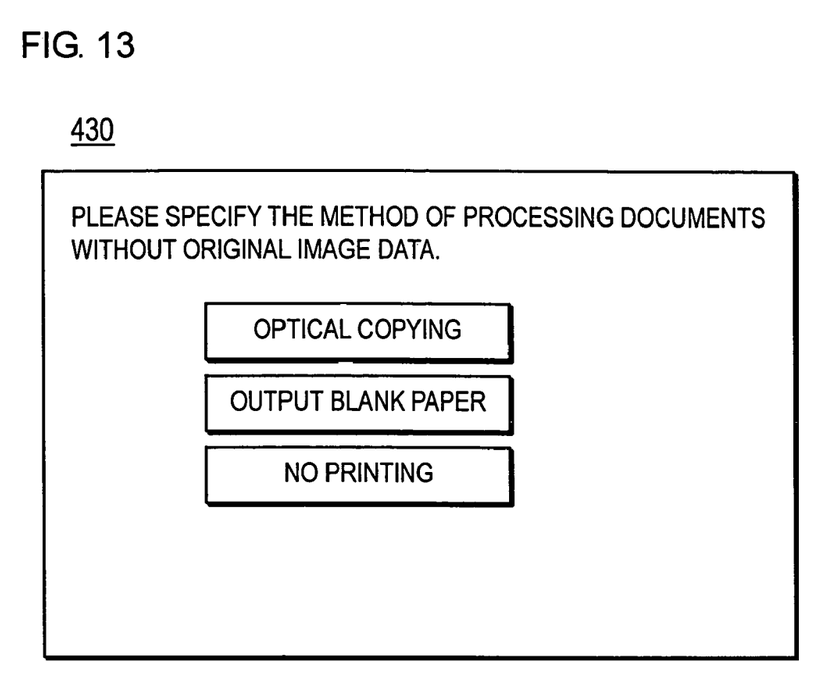
FIG. 13 is an example screen to be displayed on a touch panel of operating unit 130 of MFP 100.

On the other hand, if there is an instruction for printing on IC-tagged printing paper in step S114 (S114: Yes), it displays, as shown in a screen 430 of FIG. 13, a processing method instruction screen for the document with no original image data on the touch panel of operating unit 130 (S115), and accepts the instruction input for the processing method for conventional documents or IC-tagged documents having no original image data on IC tags (S116-S117). In this embodiment, either one of the modes: "Optical copying"; "Discharge blank paper"; or "No printing" can be specified as a processing method as indicated in screen 430. "Optical copying" here is a mode where the document is optically scanned and it is used for a case where is it desired to print the document image even when there is not original image data. "Discharge blank paper" is a mode for not printing the document image and discharging the unprinted printing paper, and it is selected for securely synchronizing the image (blank) printed on the IC-tagged printed matter to be discharged and the image data on the IC tag (no data) as it is impossible to store original image data in the IC tag of the IC-tagged printing paper in case of documents with no original image data. It is also selected when it is desired to print based only on the original image data in order to maintain the image quality or to maintain the layout such as in the case of the double sided printing, the N-in-1 printing (printing the data of N-pages arranged as a single page output data), and the booklet printing. "No printing" is a mode for no output and is selected when it is desired to save the cost and time by eliminating unnecessary output as it is desired to print only with highest standard of image quality based on the original image data.

When "Optical copying" is specified in step S116-S117 (S116: Yes), it proceeds to step S128 of FIG. 8, transports the first sheet of the document set on document tray 145 to a specified scanning position on document table 146 by means of ADF 141 (S128 and S129), searches IC tags by means of IC tag reader 143B to determine whether the sheet on document table 146 is an IC-tagged document (S130). When IC tag is detected from the document on document table 146, it is judged as an IC-tagged document (S130: Yes), reads the attribute information and original image data of said document from the IC tags of the document on document table 146 by means of IC tag reader 143B, and stores it in memory 120 (S131) It then prints the original image data on the IC-tagged paper based on the attribute information by means of printing unit 151 (S132), writes the attribute information and original image data on the IC tag by means of IC tag writer 152 (S133), and discharges the printing paper to paper discharge tray 154 (S134). If IC tag is not detected on the document on document table 146 in step S130 (S130: No), it judges that it is a conventional document (S130: No), scans document image by means of optical scanning unit 142, converts it to image data (S135), prints it on the IC-tagged printing paper by means of printing unit 151 (S136), and discharges it to paper discharge tray 154 (S134). It repeats the same process for the rest of the unprocessed document (S137: No, S138, and S129-S137), and terminates the image forming process when all the documents are processed (S137: Yes).

When "Discharge blank paper" is specified in step S116-S117 (S116: No and S117: Yes), it proceeds to step S139 of FIG. 9, performs the same processes on selects the first sheet of the document set on document tray 145 as those in the aforementioned steps S129-S134 (S139-S145). However, if no IC tag is detected from the document on document table 146 in step S141, it judges that it is a conventional document (S141: No), and discharges it as a blank paper, i.e., without printing the document image on the IC-tagged printing paper, to paper discharge tray 154 (S145). It repeats the same process for the rest of the unprocessed document (S146: No, S147, and S140-S145), and terminates the image forming process when all the documents are processed (S146: Yes).

When "No printing" is specified in step S116-S117 (S116: No and S117: No), it proceeds to step S148 of FIG. 10, performs the same processes on the first sheet of the document set on document tray 145 as those in the aforementioned steps S129-S134 (S148-S154). However, if no IC tag is detected from the document on document table 146 in step S150, it is judged to be a conventional document (S150: No) and proceeds to the next document providing no output. It repeats the same process for the rest of the unprocessed document (S155: No, S156, and S149-S154), and terminates the image forming process when all the documents are processed (S155: Yes).

The invention is not limited to the embodiment described above, but also can be changed in various ways within the scope of the claims.

For example, in each of the embodiments described above, image output unit 150 can be so constituted not just to print the image data on IC-tagged printing paper or conventional printing paper by means of printing unit 151 or to write it on the IC tag of the IC-tagged printing paper by means of IC tag writer 152, but also to transmit it to external equipment via output interface 153.

Although MFP is used as an example of the image forming device according to the present invention, MFP 100 can be a copying machine dedicated for copying IC-tagged printed matter (or a mixture thereof) (copying to conventional printing paper from IC-tagged printed matter) or a copying machine dedicated for preparing IC-tagged printed matter (copying to IC-tagged printing paper from IC-tagged printed matter).

The image forming method and the image forming device according to this invention can be realized by a dedicated hardware circuit for executing the abovementioned steps, or by causing a CPU to execute a program where said steps are described. If the present invention is to be materialized by the latter means, said programs for operating the image forming device can be provided by computer-readable recording media such as a floppy® disk and CD-ROM, or can be provided on-line via a network such as the Internet. In this case, the program recorded on the computer readable recording medium is normally transported to and stored in a memory device such as ROM and a hard disk. The program can also be provided as independent application software or can be built into the software of the image forming device as a part of its function.

As can be seen from the above, the image forming device of this invention is capable of automatically identify whether a particular document is an electronically tagged document or not when the document is a mixture of electronically tagged document and conventional document, and prints out the entire document using an appropriate method for each sheet of document depending on the type of document by printing image data read out from the electronic tags in case of an electronically tagged document or printing image data obtained by optical scanning in case of a conventional document.

Moreover, the image forming device of the present invention is capable of printing blank paper if the document is not an electronically tagged document, so that the image (blank) printed on the IC-tagged printed matter to be outputted and the image data (no data) in the IC tag always synchronized when it is desired to print based only on the original image data in order to maintain high image quality, and also is capable of printing maintaining the original layout when the double sided printing or the like is specified.

Further, the image forming device of the present invention is capable of saving processing time and cost by eliminating unnecessary printing when it is desired to print only based on the original image data in order to maintain high image quality without printing if the document is not an electronically tagged document.

What is claimed is:

1. An image forming device comprising:
a transporting unit for transporting a document sheet by sheet to a specified reading position;
a document judgment unit for judging whether the document transported by said transporting unit is an electronically tagged printed matter that includes an electronic tag storing original image data;
a printing paper judgment unit for judging whether there is an instruction for printing the original image data on an electronically tagged printing paper equipped with an electronic tag;
a reading unit for reading the original image data from the electronic tag of the document which is judged as said electronically tagged printing matter by said document judgment unit, when said printing paper judgment unit judges that there is an instruction for printing on an electronically tagged printing paper equipped with a electronic tag; and
a printing unit for printing the original image data on an electronically tagged printing paper equipped with an electronic tag, wherein the original image data is read by said reading unit, wherein
said printing unit issues a blank paper as an output, when a document is judged not as an electronically tagged matter by said document judgment unit while said printing paper judgment unit judges that there is an instruction for printing on a printing paper equipped with a electronic tag.

2. An image forming device of claim 1, wherein said electronic tag transmits or receives electronic data by means of wireless communications.

3. An image forming method comprising:
a transporting step of transporting a document sheet by sheet to a specified reading position;
a document judgment step of judging whether the document transported by said transporting step is an electronically tagged printed matter that includes an electronic tag storing original image data;
a printing paper judgment step of judging whether there is an instruction for printing the original image data on an electronically tagged printing paper equipped with an electronic tag;
a reading step of reading the original image data from the electronic tag of the document which is judged as said electronically tagged printing matter by said document judgment step, when said printing paper judgment step judges that there is an instruction for printing on an electronically tagged printing paper equipped with a electronic tag; and
a printing step of printing the original image data on an electronically tagged printing paper equipped with an electronic tag, wherein the original image data is read by said reading step, wherein
said printing step issues a blank paper as an output, when a document is judged not as an electronically tagged matter by said judgment step while said printing paper judgment step judges that there is an instruction for printing on a printing paper equipped with a electronic tag.

4. An image forming method of claim 3, wherein said electronic tag transmits or receives electronic data by means of wireless communications.

5. A non-transitory computer-readable medium storing an image forming program for causing an image forming device to execute:
a transporting step of transporting a document sheet by sheet to a specified reading position;
a document judgment step of judging whether a document transported by said transporting step is an electronically tagged printed matter that includes an electronic tag storing original image data;
a printing paper judgment step of judging whether there is an instruction for printing the original image data on an electronically tagged printing paper equipped with an electronic tag;
a reading step of reading the original image data from the electronic tag of the document which is judged as said electronically tagged printing matter by said document judgment step, when said printing paper judgment step judges that there is an instruction for printing on an electronically tagged printing paper equipped with a electronic tag; and
a printing step of printing the original image data on an electronically tagged printing paper equipped with an electronic tag, wherein the original image data is read by said reading step, wherein
said printing step issues a blank paper as an output, when a document is judged not as an electronically tagged matter by said document judgment step while said printing paper judgment step judges that there is an instruction for printing on a printing paper equipped with a electronic tag.

6. A non-transitory computer-readable medium storing an image forming program of claim 5, wherein said electronic tag transmits or receives electronic data by means of wireless communications.

7. The image forming device of claim 1 further comprising:
a writing unit for writing the original image data read by said reading unit into the electronic tag of an electronically tagged printing paper equipped with a electronic tag; wherein
said printing unit is only allowed to print the original image data read from the electronic tag when a document is an electronically tagged printed matter and its electronic tag does not store copy prohibiting information;
said writing unit is only allowed to write the original image data into the electronic tag of an electronically tagged printing paper equipped with an electronic tag when a document is an electronically tagged printed matter and its electronic tag does not store copy prohibiting information; and
said printing unit issues a blank paper as an output and said writing unit does not write the original image data into the electronic tag of an electronically tagged printing paper equipped with an electronic tag, when a document is judged not as an electronically tagged matter by said document judgment unit while said printing paper judgment unit judges that there is an instruction for printing on a printing paper equipped with a electronic tag.

8. The image forming device of claim 1 further comprising:
a writing unit for writing the original image data read by said reading unit into the electronic tag of an electronically tagged printing paper equipped with a electronic tag; wherein
said printing unit is only allowed to print the original image data read from the electronic tag when a document is an electronically tagged printed matter and its electronic tag does not store copy prohibiting information;

said writing unit is only allowed to write the original image data into the electronic tag of an electronically tagged printing paper equipped with an electronic tag when a document is an electronically tagged printed matter and its electronic tag does not store copy prohibiting information; and said printing unit issues no output and said writing unit does not write the original image data into the electronic tag of an electronically tagged printing paper equipped with an electronic tag, when a document is judged not as an electronically tagged matter by said document judgment unit while said printing paper judgment unit judges that there is an instruction for printing on a printing paper equipped with a electronic tag.

9. An image forming device of claim 1, wherein the original image data is data of an image on the document sheet.

10. An image forming method of claim 3, wherein the original image data is data of an image on the document sheet.

11. A non-transitory computer readable medium storing an image forming program of claim 5, wherein the original image data is data of an image on the document sheet.

* * * * *